W. W. KRUTSCH.
RESILIENT WHEEL.
APPLICATION FILED FEB. 6, 1919.
1,384,901.
Patented July 19, 1921.
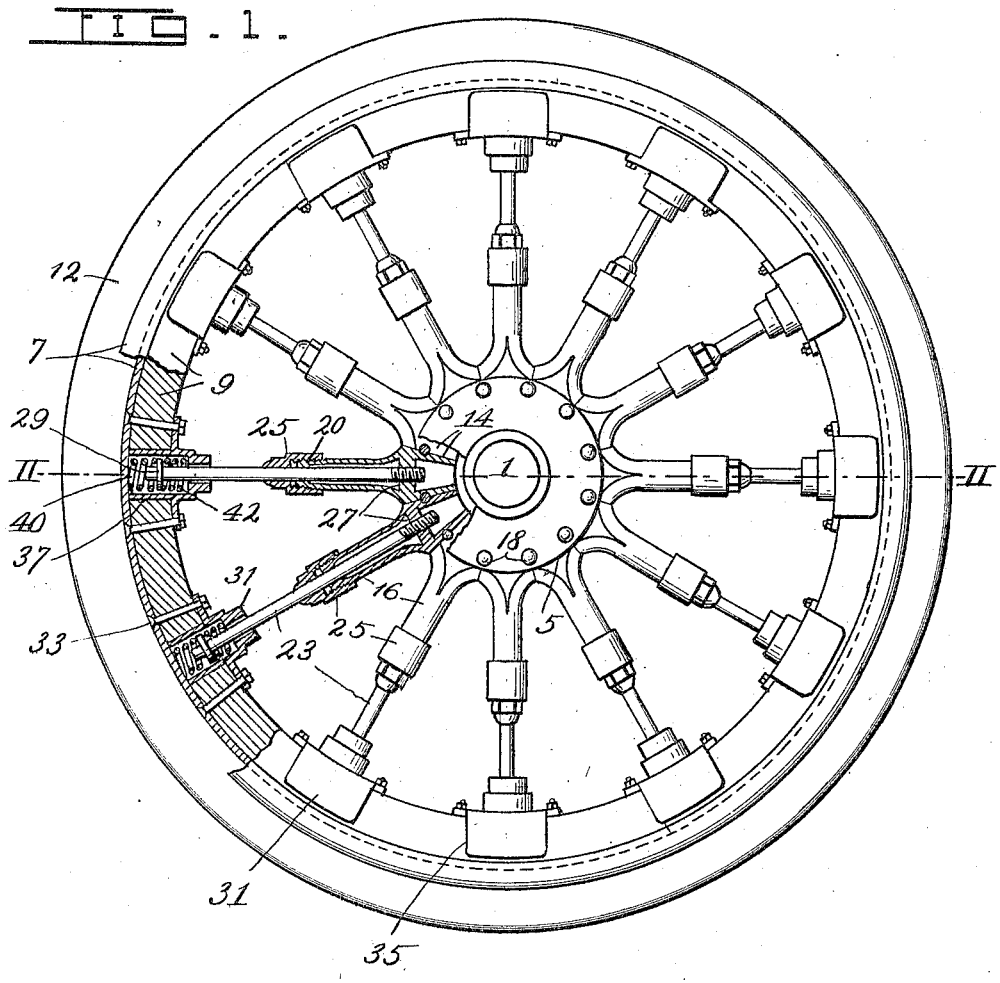
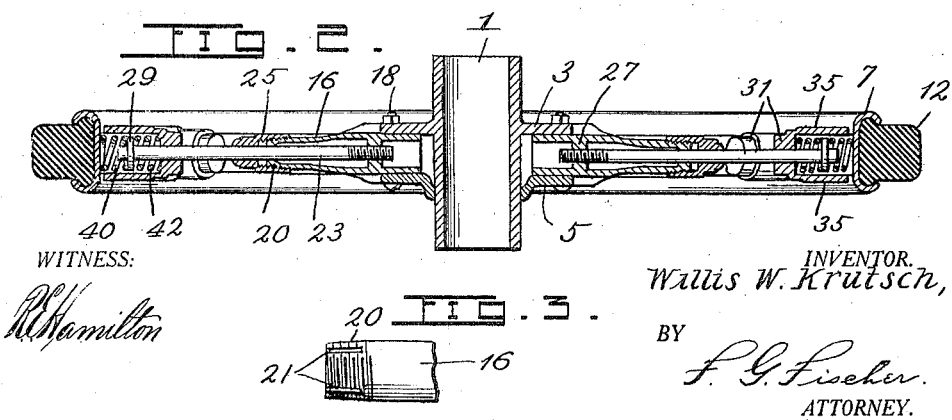
WITNESS:
R. E. Hamilton
INVENTOR.
Wallis W. Krutsch,
BY
F. G. Fischer.
ATTORNEY.

UNITED STATES PATENT OFFICE.

WILLIS W. KRUTSCH, OF COFFEYVILLE, KANSAS.

RESILIENT WHEEL.

1,384,901.  Specification of Letters Patent.  Patented July 19, 1921.

Application filed February 6, 1919. Serial No. 275,293.

*To all whom it may concern:*

Be it known that I, WILLIS W. KRUTSCH, a citizen of the United States, residing at Coffeyville, in the county of Montgomery and State of Kansas, have invented certain new and useful Improvements in Resilient Wheels, of which the following is a specification.

My invention relates to improvements in vehicle wheels, and one object is to provide a resilient wheel, which is not only adaptable to general use but can be employed to advantage on motor trucks, pleasure cars, etc.

A further object is to provide a resilient wheel which does away with the necessity of pneumatic tires and their consequent inconvenience and expense owing to punctures, blow-outs, etc.

Other objects and advantages will hereinafter appear, and in order that the invention may be fully understood, reference will now be made to the accompanying drawing, in which:

Figure 1 is a side elevation partly in section of a wheel constructed in accordance with my invention.

Fig. 2 is a horizontal section on line II—II of Fig. 1.

Fig. 3 is an enlarged, broken detail view of a tubular spoke member employed in carrying out the invention.

Referring in detail to the various parts, 1 designates a hub having an integral, peripheral flange 3 and a removable flange 5.

7 designates a metallic rim reinforced by wooden fellies 9 and provided with a solid rubber tire 12.

The flanges 3 and 5 are spaced apart, as shown on Fig. 2, to receive the inner, segmental ends 14 of tubular spoke members 16 radially disposed with relation to the hub 1.

The tubular spoke members 16 are held in position between the hub flanges 3 and 5 by transverse bolts 18 and are provided with tapered outer terminals 20 having slits 21, so that they may be compressed firmly around companion spoke members 23 by means of internally tapered, compression nuts 25 threaded upon said tapered terminals 20.

Each companion spoke member 23 has its inner end threaded into a nut 27 within the tubular member 16 and is provided adjacent its outer end with an integral collar 29. The outer ends of the companion members 23 are slidably arranged in housings 31 removably secured to the rim 7 and the fellies 9 by bolts 33.

Each housing 31 has a pair of flanges 35 engaging the opposite sides of two adjacent fellies 9 and a tubular extension 37 against which the adjacent ends of said fellies abut to relieve the bolts 33 of lateral stresses.

40 and 42 designate coil springs arranged within the tubular extension 37 of each housing, the spring 40 being interposed between the rim 7 and one side of the collar 29 while the spring 42 is interposed between the opposite side of said collar 29 and the adjacent end of said housing 31. The diameter of the springs 40 and 42 is such that when the same are compressed they fit snugly within the tubular extension 37, so that they cannot rattle when the wheel is in motion.

From the foregoing description it will be understood that the hub 1 can be adjusted centrally of the rim 7 by proper longitudinal adjustment of the companion spoke members 23 within the tubular spoke members 16, after which they are secured against independent movement, through the intermediacy of the nuts 27 and the compression nuts 25. The compression springs 40 and 42 allow independent movement between the spokes and the rim of the wheel to render the same resilient, so that said wheel may pass over obstructions without undue shock to the vehicle.

While I have shown the tubular spoke members 16 consisting of individual units they may be cast together to form a single unit. I also reserve the right to make such other changes as properly fall within the spirit and scope of the claim.

Having thus described my invention, what I claim and desire to secure by Letters Patent, is:

A vehicle wheel consisting of a rim, a hub, tubular spoke members secured to said hub and having outer tapered split terminals, internal nuts in said tubular spoke members, companion spoke members having their inner ends threaded into said tubular spoke members, compression nuts threaded upon the split terminals of the tubular spoke members to cause said terminals to grip the companion spoke members, and means yieldably connecting the outer ends of the companion spoke members to the rim.

In testimony whereof I affix my signature in the presence of two witnesses.

WILLIS W. KRUTSCH.

Witnesses:
F. G. FISCHER,
L. J. FISCHER.